United States Patent [19]

Diehl et al.

[11] Patent Number: 5,038,610
[45] Date of Patent: Aug. 13, 1991

[54] ANEMOMETER

[75] Inventors: Walter Diehl, Hanau; Karlheinz Eckert, Gründau; Martin Hohenstatt, Hammersbach; Dieter Link, Hanau; Otokar Prokopec, Hanau, all of Fed. Rep. of Germany

[73] Assignee: Sensycon Gesellschaft fur industrielle Sensor-systeme und ProzeBleitechnik mbH, Fed. Rep. of Germany

[21] Appl. No.: 452,332

[22] Filed: Dec. 19, 1989

[30] Foreign Application Priority Data

Dec. 24, 1988 [DE] Fed. Rep. of Germany ....... 3843746

[51] Int. Cl.⁵ .............................................. G01F 1/68
[52] U.S. Cl. ................................. 73/204.26; 73/118.2
[58] Field of Search .............. 73/861.25, 861.26, 118.2

[56] References Cited

U.S. PATENT DOCUMENTS

| 4,320,655 | 3/1982 | Kammermaier et al. | 73/204.26 |
| 4,471,647 | 9/1984 | Jerman et al. | 73/23.1 X |
| 4,542,630 | 9/1985 | Renken et al. | 73/204.26 X |
| 4,633,578 | 1/1987 | Aine et al. | 73/204.23 X |
| 4,783,996 | 11/1988 | Ohta et al. | 73/204.26 X |
| 4,870,860 | 10/1989 | Ohta et al. | 73/204.26 |
| 4,891,978 | 1/1990 | Sumal | 73/204.26 |

FOREIGN PATENT DOCUMENTS

| 0235358 | 9/1987 | European Pat. Off. |
| 0235362 | 9/1987 | European Pat. Off. |
| 2171800 | 9/1986 | United Kingdom |

Primary Examiner—Herbert Goldstein
Attorney, Agent, or Firm—Cushman, Darby & Cushman

[57] ABSTRACT

An anemometer with a substrate (12) comprising glass material, the length L of the substrate being considerably greater than the width B and the thickness D. The edge areas (20, 22) of the substrate are not substantially heated by the formation of the surface resistor.

11 Claims, 2 Drawing Sheets

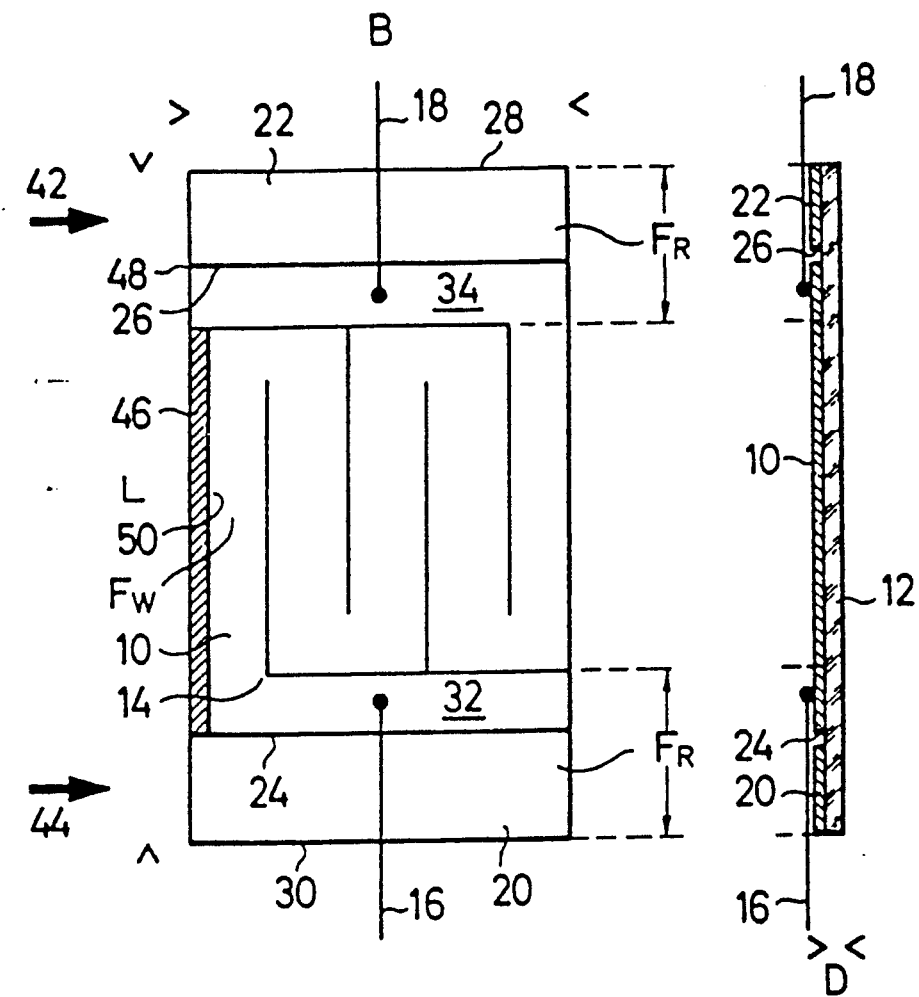
FIG. 1
FIG. 2
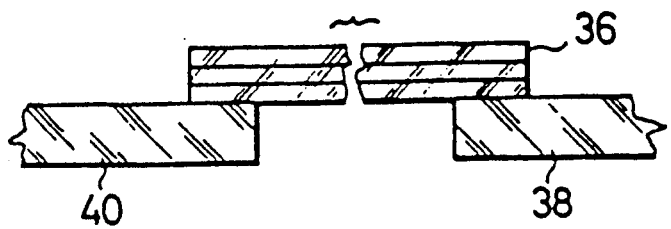
FIG. 3

ANEMOMETER

BACKGROUND OF THE INVENTION

The invention relates to an anemometer for quantity measurement of gases or fluids, in particular for determining an air quantity intake of an internal combustion engine through a channel, having a block-shaped substrate of low thermal conductivity arranged in a channel, having on at least one surface of the substrate a temperature-dependent surface resistor, current connecting means to the surface resistor, and a holder for the substrate.

To achieve in particular for internal combustion engines an optimum combustion sequence, accurate information on the respective air quantity intake must be available. The ignition point, the fuel quantity to be injected and similar can be controlled as a function thereof.

Anemometers are available in a wide variety of designs. Conventional anemometers operate on the constant-temperature principle, as set forth in German patent application DE-AS 26 49 040. To determine the air quantity measurement, a bridge circuit is used in which a temperature-dependent resistor is located. This resistor is electrically heated and subjected to the flow of the fluid to be measured. An electrical control circuit ensures that the heated electrical resistor is heated to a constant temperature. Measurement of the flow through the bridge permits conclusions to be drawn as to the air quantity flowing past the resistor. A second temperature-dependent resistor can be connected in a second bridge leg to compensate for the effect of the intake air temperature.

A time variation in the characteristic curves should be avoided partly by the design of the temperature-dependent resistors and their arrangement in relation to the air flow. The selection and the design of the substrate supporting the resistor are intended to ensure that thermal inertias of the substrate are largely ruled out, to ensure rapid recording of the air quantity or of changes thereto.

As regards the current connecting means, it may be noted that these can be designed in the form of wires, for example, or by soldering or by conductive adhesive attachment to a conductive holder.

SUMMARY OF THE INVENTION

The object of the present invention is therefore to design an anemometer of the type mentioned at the outset such that a stable temperature condition is obtained almost inertia-free for the temperature-dependent surface resistor when the flow speed changes.

The object is substantially attained in accordance with the invention by the substrate comprising a glass material, by the length L and the width B of the substrate being considerably greater than its thickness D, and by the edge areas of the substrate on the holder side being substantially not heatable by the surface resistor.

Thanks to the combination of features known in some cases, an anemometer is provided that has a temperature-dependent surface resistor in which a stable temperature condition is obtained very quickly. The dimensioning of the substrate contributes by a substantial amount to this. Since the substrate thickness is very low in comparison to its length and width, it is ensured that a stable temperature condition is quickly obtained when the flow speed changes, although glass is a poor heat conductor. Thanks to the low thermal conductivity of the substrate in combination with the unheated edge area, the effect is that no heat flows off to the holder: the heat flowing from the heated area into the edge area passes substantially to the fluid and is not conveyed via heat conduction into the slender strips of the edge area where the latter is in contact with the holder. Since the edge areas of the substrate on the holder side cannot be heated by the surface resistor, even if the entire substrate area is coated with the resistor material, it is further ensured that a heat loss via the edge areas to the holder itself is largely ruled out.

The length L is preferably 5 to 10 times the width B, which in its turn is preferably 10 to 30 times the thickness D. It is of course also possible to select a square surface, preferred thicknesses of the substrate being between 100 and 200 $\mu$m.

In a noteworthy embodiment, it is provided that the substrate, provided with surface resistor material preferably over its entire surface, has insulating partition lines parallel to the edge areas on the holder side, so that it is additionally ensured that there is no heat flow towards the holders.

A further embodiment provides for the platinum layer to be partially removed in the area of the unheated edge, with only enough remaining to permit contact. It must however be remembered that this does not generate a notable resistance in the edge area and thus a heating effect.

An unexpected optimization of the properties to achieve inertia-free adjustment of a stable temperature condition is achieved with a ratio from 3:1 to 1:1 between the surface of the current-carrying surface resistor, which preferably has a meander-like structure, and the surfaces which are not heated.

The material of the surface resistor, such as platinum, it itself preferably deposited by sputtering onto the substrate surface. It is of course possible to arrange surface resistors on opposite sides of the substrate, where here too the edge surfaces can be separated from the current-carrying surfaces or removed in the area of the current connecting means, or heating does not occur in the area of the onflow edge.

In accordance with a further embodiment, it is proposed that the expansion coefficient of the substrate be approximately 7 to $10 \times 10^{-6}/°K$. The material of the surface resistor preferably has approximately the same expansion coefficients as the substrate.

In order to further reduce the thermal conductivity of the substrate, the latter can be composed of several glass layers connected by an adhesive of which the thermal conductivity is lower than that of the materials to be connected. Accordingly, the result is a sandwich structure which ensures an adequate inherent stability of the substrate for holding the surface resistor(s) even with quite low thermal conductivity.

Finally, the substrate can also be held or contacted from one side.

A further noteworthy proposal provides for the substrate not to be heated in a narrow strip along the onflow edge, for example by the onflow-side—i.e. first—meander path being set back slightly. It is further favourable for the platinum to be removed here too. It remains relatively cold there due to the poor thermal conductivity of the substrate. There is hardly any heat transmission to the fluid, so that contamination, which predominantly settles on the onflow edge, cannot affect heat transmission to the fluid. The width of the strip along the onflow edge, which is not heated, is very much smaller than the width B of the substrate; the ratio is preferably less than 1:10.

BRIEF DESCRIPTION OF THE DRAWINGS

Further details, advantages and features of the invention are made clear not only in the claims and the features to be found therein, singly and/or in combination, but also in the following description of embodiments shown in the drawing, in which FIG. 1 shows a plan view of a substrate provided with a surface resistor, FIG. 2 shows a side view of the substrate according to FIG. 1, FIG. 3 shows a further embodiment of a substrate.

DETAILED DESCRIPTION OF PREFERRED EMBODIMENTS

Figure 4:
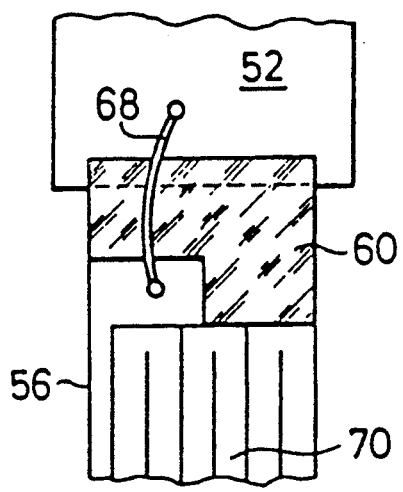
FIGS. 4 and 5 show embodiments of current connecting means.

FIG. 1 represents a plan view of a temperature-dependent surface resistor (10) arranged substantially over the entire surface of a substrate (12). The material of the surface resistor can comprise, for example, platinum and is deposited on the substrate surface by sputtering. By etching, for example, or cutting through by means of a laser beam, meander-like current paths (14) are imprinted through which flows the current supplied via connections (16) and (18), so having the desired heating effect on the surface resistor (10) and hence on the substrate (12). The width of the current paths (14) is very low in comparison to that of the connection paths (32) and (34). In the latter, heating is negligible because of the low resistance. The edge areas (20) and (22) of the surface resistor material are electrically separated from the current-carrying area by an insulating partition line (24) and (26) respectively. Heat generated in the current paths (14) cannot flow off via the edge areas.

In order to achieve an almost inertia-free temperature setting, the substrate (12) is dimensioned, as regards its length L, width B and thickness D, such that the thickness D is quite low in comparison to the length L and width B. The thickness D is preferably 10 to 30 times lower than the width B, which in its turn can be 5 to 10 times lower than the length L. It is of course also possible to select the length and the width identical. With a square embodiment, length L and width B can each be selected 1 mm, the thickness D less than 200 μm, preferably between 100 and 150 μm. With an oblong form, the length can be 10 mm and the width 2 mm with an unchanged thickness D between 100 and 150 μm. Other dimensions are also possible, although it should be ensured, as already mentioned, that the thickness D is very low in comparison to length L and width B.

Optimization of the array can also be achieved when the face areas $F_R$, not heated and comprising the connection paths (32) and (34) and those areas through which extend insulating partition lines (24) and (26) and the faces (28) and (30), are in a ratio to the effective surface resistor surface $F_W$ of approximately 3:1 to 1:1, as $F_W$ to $2 F_R$. $2 F_R$ is hereinafter referred to as $F_{rges}$. The insulating partition lines (24), (26) are of course not absolutely necessary.

Substrate (12) is a material of very low thermal conductivity. The substrate (12) preferably comprises glass with a thermal conductivity of 0.8−1.3 W/m K.

Concerning the dimensions, it must also be noted that the current paths (32) and (34), running parallel to faces (28) and (30) respectively and connected to the electrical connections (16) and (18), can have a width of 0.5 mm, whereas the width of the edge strips (20) and (22) can be in the region of 0.5 to 2.5 mm.

FIG. 1 shows a further noteworthy feature: as the arrows (42) and (44) are intended to indicate, the flow direction to the substrate is from the left, i.e. the fluid is deflected off the left-hand longitudinal edge (48). The invention now provides, based on past experience, for an unheated strip (46) along the onflow edge (48) extending at least in the area of the meandering current paths (14). This can be achieved by the onflow-side, i.e. first meander path (50) being set back slightly. This is possible by providing a partition, line not described in detail. It can also be favourable here for the sputter-deposited material, i.e. platinum in the embodiment, to be removed in this area. By the provision of the narrow strip, which can, as mentioned, extend up to the faces (28) and (30), the substrate remains relatively cold because of the poor thermal conductivity. There is therefore hardly any heat transmission to the fluid. As a result, contaminations, which tend to accumulate on the onflow edge (48) cannot affect heat transmission to the fluid. Consequently, it is not necessary, unlike the prior art with highly thermally-conducting substrate, to deposit an additional heat-insulating layer or to set the first meander path several millimeters back from the onflow edge. The latter would reduce the heat transfer absolutely (limit layer form) and so increase the response time.

FIG. 3 shows a further embodiment of a substrate (36) for holding a surface resistor or layer resistor. The substrate (36) comprises layers of low thermal conductivity arranged one above the other, e.g. glass plates connected to one another by adhesive and having a thermal conductivity lower than that of glass. The individual glass plates have a stability here which would not in itself be sufficient for arrangement in the intake channel of a combustion engine, for example, together with a surface resistor. However, the layer construction ensures the required stability, with the overall thermal conductivity of the substrate (36) being further reduced by the adhesive layers. It can also be seen that the substrate (36) is supported on the holders (38) and (40).

Figure 5:
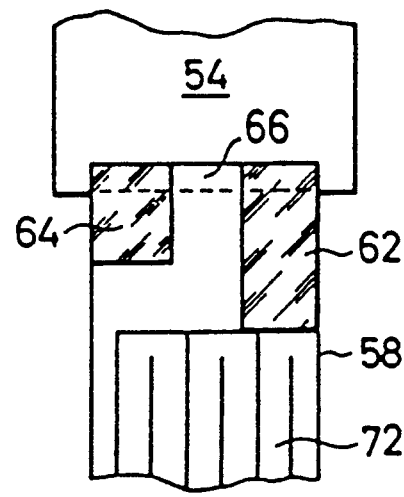

FIGS. 4 and 5 represent examples of contacts between a holder (52) or (54) and a substrate (56) or (58) respectively, with the substrate being provided with a surface resistor. The areas (60), (62) and (64) shown hatched in the drawing show no material deposited on the substrate (56) or (58). Contact is then achieved with the areas provided with the material, e.g. a wire (68), or by soldering or adhesion with a conductive adhesive (66). The surface of the removed areas (60)/(62) and (64) must be selected such that there is no notable resistance directly in the areas of the contact, so that heat is generated. This heat is instead generated exclusively in the meander-structured surface resistor (70) and (72).

In an application of the substrate (12) designed in accordance with the invention, with a surface resistor (10) deposited over the entire surface of the substrate and the edge sections (20) and (22) comprising the same material in an anemometer, the temperature-dependent resistor can be arranged in a bridge leg in order to be subjected to current as a function of the tuning of the bridge in such a way that the temperature is constant. The current necessary here then represents a dimension for the air quantity flowing past the temperature-dependent resistor (10).

The necessary control means for the electric power and signal assessment can be of conventional design.

We claim:

1. An anemometer for flow measuring, in particular for determining an air quantity flowing through a passage of an internal combustion engine, having a block-shaped substrate consisting of glass material of low thermal conductivity arranged in the passage, and said substrate having at least one edge area having a side face parallel with a flow direction facing a holding device for the substrate, having on at least one surface of the substrate a temperature-dependent resistor material covering substantially the entire area of the substrate as well as connecting means for conducting electricity to said surface resistor material, wherein the resistor material forming an area of square resistance is divided into a meander shaped area with surface $F_w$ and into said edge area with surface $F_{Rges}$, said meander shaped area comprising essentially the whole resistance value of said square resistance being heated and supplying a temperature-dependent signal enabling conclusions about the flow measurement, said edge area running parallel with said flow direction having essentially no contribution to square resistance value to be measured, the proportion of the surface $F_w$ to the surface $F_{Rges}$ is approximately $1/1 < F_w/F_{Rges} < 3/1$, and wherein the length L and the width B are considerably greater than the thickness D of the substrate.

2. An anemometer according to claim 1, wherein the expansion coefficient of the substrate is approximately 7 to $10 \times 10^{-6}/°K$.

3. An anemometer according to claim 1, wherein the substrate and the material of the surface resistor have approximately the same expansion coefficients.

4. An anemometer according to claim 1, wherein the substrate is composed of several glass layers connected by an adhesive of which the thermal conductivity is lower than that of the materials to be connected.

5. An anemometer according to claim 1, wherein the length L and the width B of the substrate are each 10 to 500 times the thickness D of the substrate.

6. An anemometer according to claim 1, wherein the thickness D of the substrate is 40 μm to 150 μm, and the length L 10 to 12 mm and the width B 1 to 3 mm.

7. An anemometer according to claim 1, wherein one insulating partition line is running parallel to the edge area having said side face, parallel with said flow direction, facing said holding device for the substrate.

8. An anemometer according to claim 1, wherein said substrate having a front edge area facing the flow to be measured is covered with said temperature-dependent surface resistor material, said edge area being electrically insulated from said area of square resistance.

9. An anemometer according to claim 8, wherein said material is removed from the front edge area facing the flow.

10. An anemometer according to claim 9, wherein the ratio of the width of the front edge area facing the flow to the width B of the substrate is 1:10.

11. An anemometer according to claim 8, wherein the ratio of the width of the front edge area facing the flow to the width B of said substrate is 1:10.

* * * * *